United States Patent
Niizuma et al.

(10) Patent No.: US 6,384,561 B1
(45) Date of Patent: May 7, 2002

(54) SERVO CONTROL APPARATUS

(75) Inventors: Motonao Niizuma; Shinobu Nakajima, both of Tokyo (JP)

(73) Assignee: Ishikawajima-Harima Heavy Industries Co., LTD, Tokyo (JP)

( * ) Notice: Subject to any disclaimer, the term of this patent is extended or adjusted under 35 U.S.C. 154(b) by 0 days.

(21) Appl. No.: 09/648,552

(22) Filed: Aug. 28, 2000

(30) Foreign Application Priority Data

Jan. 21, 2000 (JP) ........................................ 2000-012972

(51) Int. Cl.[7] .............................................. G05B 11/32
(52) U.S. Cl. ........................ 318/625; 318/563; 318/565; 318/628
(58) Field of Search ..................... 318/560, 563–566, 318/625, 626, 628

(56) References Cited

U.S. PATENT DOCUMENTS

| | | | |
|---|---|---|---|
| 4,159,444 A | * | 6/1979 | Bartlett et al. ............... 318/564 |
| 4,162,438 A | * | 7/1979 | Osder ........................... 318/564 |
| 4,209,734 A | | 6/1980 | Osder |
| 4,290,000 A | | 9/1981 | Sun |
| 5,067,080 A | | 11/1991 | Farman |
| 6,046,566 A | * | 4/2000 | Sonoda et al. ............... 318/625 |
| 6,188,194 B1 | * | 2/2001 | Watanabe et al. ........... 318/625 |

FOREIGN PATENT DOCUMENTS

DE 197 32 764 2/1999

* cited by examiner

*Primary Examiner*—Marlon T. Fletcher
(74) *Attorney, Agent, or Firm*—Griffin & Szipl, P.C.

(57) ABSTRACT

Master and slave servo control circuits 2a and 2b are configured with servo controllers 3a, 3b, servo amplifiers 4a, 4b, servo motors 5a, 5b, feedback detectors 6a, 6b and error detectors 7a, 7b, and the servo motors 5a, 5b are mechanically interlocked and connected to a load. At a location upstream from the servo amplifier 4b, a torque command value selector 21 is provided; when the error detector 7a does not detect an error in the servo control circuit 2a, the selector switches so that the servo amplifier 4a and the servo amplifier 4b both receive a torque command value from the servo controller 3a, and when the error detector 7a detects an error in the servo control circuit 2a, the selector switches so that the servo amplifier 4b receives a torque command value from the servo controller 3b. Normally, servo motors 5a and 5b control the load in a master-slave torque control mode, and if either servo control circuit 2a or 2b fails, the servo motor 5a or 5b in the failed circuit is made to run freely, and the normal servo control circuit 2a or 2b continues to control the load.

6 Claims, 3 Drawing Sheets

BASE DRIVE CIRCUIT

DRIVE CONTROL UNIT

SERVO CONTROL APPARATUS

BACKGROUND OF THE INVENTION

1. Technical Field of the Invention

The present invention relates to a servo control apparatus for driving a load, in particular a servo control apparatus that can control the load so that it follows the reference control value even if an abnormality occurs.

2. Prior Art

With a servo control apparatus that drives the transfer mechanism of a press machine, for instance, as the load, even if an abnormality takes place in a component device (servo controller, servo amplifier, servo motor, feedback detector, etc.) of the servo control apparatus, the transfer mechanism must operate in synchronism with the dies until the dies stop; otherwise the dies and the transfer mechanism may collide with each other. Therefore, it is mandatory for the servo control apparatus to continue to control the load even when a component device of the servo control apparatus fails.

One of the technologies known in the prior art to be capable of continuing the servo control of the load even when the servo control apparatus fails is a torque master-slave system that is configured with two sets of servo amplifiers and servo motors to drive the load.

This apparatus, an example of which is shown in FIG. 1, is provided with one master servo control circuit 2, composed of a servo controller 3 that computes the torque command signal so that a load (not illustrated) follows the reference control signal determined by a reference control adjuster 1, a servo amplifier 4 that controls the electric power supplied to a servo motor according to the torque command signal provided by the servo controller 3, the servo motor 5 for driving the load supplied with electric power from the servo amplifier 4, a feedback detector 6 to detect a feedback value from the servo motor 5, an abnormality detector 7 that detects abnormalities in the servo controller 3, servo amplifier 4, servo motor 5 and feedback detector 6 and sends command signals to the reference control adjuster 1 and servo amplifier 4.

The servo controller 3 outputs a torque command signal according to the reference control signal sent from the reference control adjuster 1 and the feedback signal from the feedback detector 6, and the calculated torque command signal is input into the servo amplifier 4. The servo amplifier 4 provides an electrical output to the servo motor 5 so that the servo motor 5 produces the torque required by the torque command signal.

In addition, this apparatus is provided with a slave servo control circuit 8 configured with a servo amplifier 9 with the same configuration and functions as the above-mentioned one, a servo motor 10, and an error detector 11 that detects abnormalities in both the servo amplifier 9 and servo motor 10 and sends a command signal to the reference control adjuster 1 and the servo amplifier 9. Furthermore, this apparatus is configured additionally with a shaft 12 that is driven by servo motors 5 and 10 so that they are mechanically interlocked with each other and drive the load, and a power transmission mechanism 13 for transmitting the rotation of the shaft 12 to the load to drive the load.

Another technology also known in the prior art relates to the servo control apparatus disclosed in the unexamined Japanese patent publication No. 87985, 1990. This apparatus is an AC servo motor drive control circuit 14 wherein AC current is converted to DC current by a single-phase rectifier circuit 16 in a converter unit 15, and a 3-phase AC servo motor 17 is driven and controlled using the DC current. The apparatus is provided also with relays 19, 20 that when a failure occurs, connect two of the three-phase power lines of the AC servo motor 17 to the smoothing capacitor 18, a component device in the converter unit 15. Because these relays 19, 20 connect the AC servo motor 17 to the smoothing capacitor 18, electrostatic energy stored in the smoothing capacitor 18 is supplied to the AC servo motor 17, and produces a stationary magnetic field, thereby stopping the AC servo motor 17.

However, according to the method based on the master-slave torque system shown in FIG. 1, only one servo controller 3 and feedback detector 6 are employed, and the servo amplifiers 4, 9 receive torque command signals from one servo controller 3. Consequently, if an abnormality occurs in the servo controller 3 or the feedback detector 6, both servo amplifiers 4, 9 cannot receive a torque command signal, so in this case, both servo motors 5, 10 go into a free running state.

Therefore, when either the servo controller 3 or the feedback detector 6 fails while the load is being operated, the load must be stopped by either (1) waiting for it to stop naturally due to friction, (2) using the braking force produced by a mechanical brake, or (3) using a dynamic braking system in which the armature of either servo motor 5 or 10 is short circuited, However, according to method (1), there is the problem that the load continues to run for a long time because the friction force acting on the load driven by the servo motor is normally small. Method (2) has the problem that the distance that the load overruns becomes large since there is a considerable time delay before the mechanical brake is actuated. In method (3), the dynamic brake is turned ON and OFF by mechanically activated contacts, and the time delay before the dynamic brake is operated is so large that the load overruns, and there is the problem that an AC motors cannot be used for servo motors 5 and 10 and only DC motors can be used. Another problem that exists with any of the above (1), (2) and (3) is that after the load enters the free running state, the position and speed of the load can no longer be controlled.

On the other hand, in the AC servo motor drive control circuit 14 shown in FIG. 2, the load can be prevented from overrunning, but there is the problem that the position and speed of the load cannot be controlled. In addition, there is another problem because only one AC servo motor 17 is used, so if the AC servo motor 17 fails, the servo-control function is lost.

SUMMARY OF THE INVENTION

The present invention aims at solving the problems mentioned above. An object of the present invention is to provide a servo control apparatus that can continue to control the load so that it follows the reference control value even if an abnormality occurs in any portion of a servo controller, servo amplifier, servo motor, or feedback detector.

To solve the aforementioned problems, the present invention provides a plurality of servo control circuits each of which can singly control a load; each servo control circuit is configured with a servo controller that computes command signals so that the load can follow a reference control value adjusted by a reference control adjuster, a servo amplifier for controlling the electric power supplied to a servo motor according to a command signal from the above-mentioned servo controller, the servo motor that is supplied with electric power from the servo amplifier and drives the load, and a feedback detector that detects the operating condition of the servo motor and feeds the detected condition back to the servo controller; the servo motor in each of the aforementioned servo control circuits is interlocked mechanically with each of the others so as to be capable of driving the one load through a drive transmission mechanism, and if an abnormality takes place in any of the above-mentioned plurality of servo control circuits, the other servo control circuits, which are still normal, can continue to control the load.

When all the servo control circuits are normal, each servo control circuit cooperates with each of the others to control the load so as to follow the reference control signal.

If an abnormality arises in any of a servo controller, servo amplifier, servo motor or feedback detector in any servo control circuit, the power from the servo amplifier to the servo motor in the servo control circuit with the abnormality is interrupted, thus the aforementioned servo motor is made to run freely, thereby normal servo control circuits can continue to control the load so as to follow the reference control signal.

Therefore, because the reference control adjuster is made to generate a reference control signal that stops the load when an abnormality occurs in any of the servo control circuits, the other servo control circuits, which are still normal, continue to control the load so that the load is stopped as it follows the reference control signal.

Among a plurality of sets of servo control circuits, one is defined as the master servo control circuit, and the other servo control circuits are considered to be slaves; a slave servo amplifier is given a command signal from the master servo controller during normal operation, at a location upstream of the servo amplifier in the above-mentioned slave servo control circuit; and a command signal selector is provided and can switch to the command signal input from the slave servo controller when an abnormality occurs in the master servo control circuit; thereby the load can be controlled in master-slave fashion to follow the reference control signal by both the master and slave servo motors when no abnormality appears in any of the servo control circuits on the master or slave sides.

Other objectives and advantages of the present invention are revealed in the following paragraphs referring to the attached drawings.

DESCRIPTION OF PREFERRED EMBODIMENTS

Figure 1:
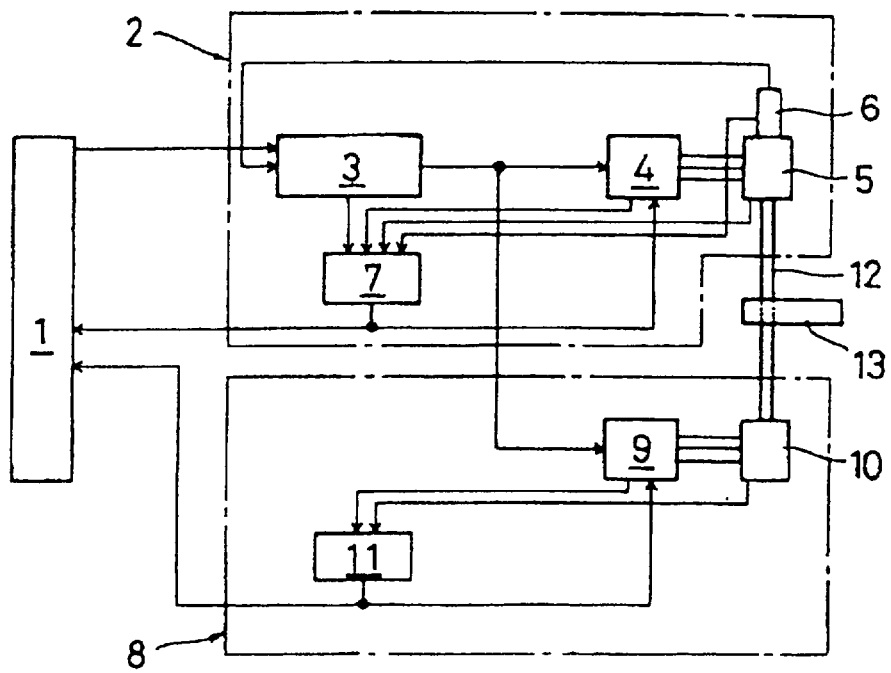
FIG. 1 is a diagram showing an example of conventional servo control apparatus.
Figure 2:
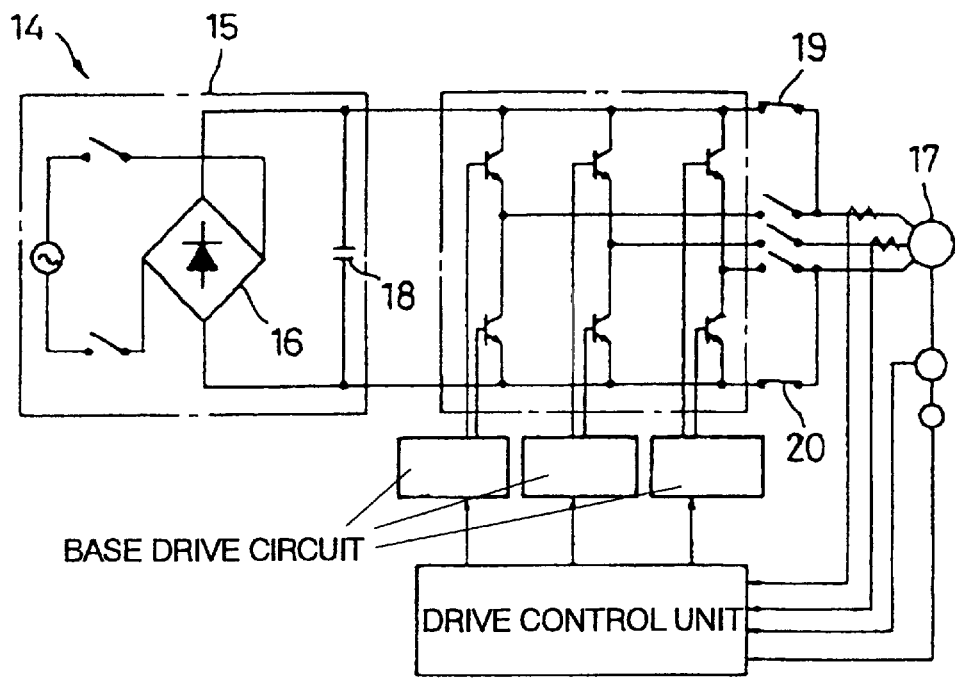
FIG. 2 is a schematic diagram of another example of conventional servo control apparatus.

Embodiments of the present invention are described below referring to the drawings.

Figure 3:
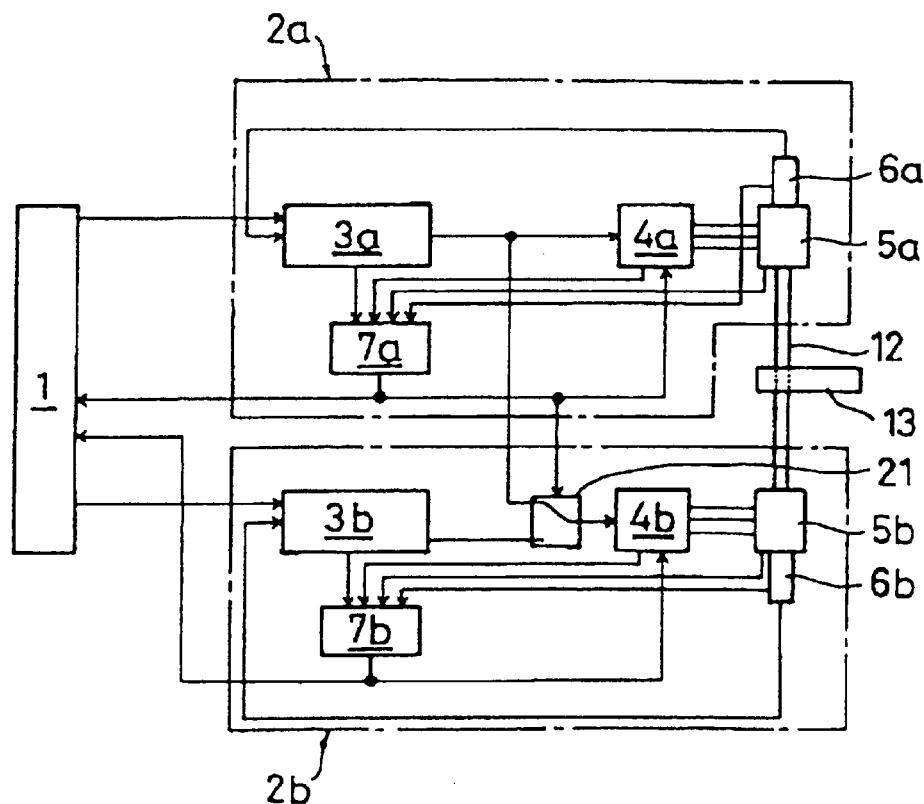
FIG. 3 is a diagram showing the first embodiment of the servo control apparatus according to the present invention.
Figure 4:
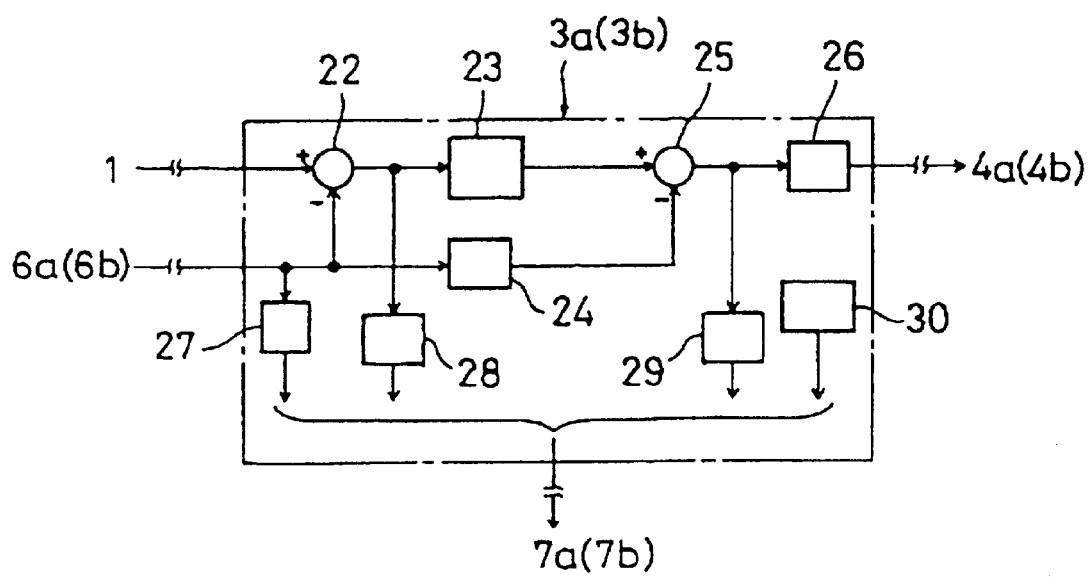
FIG. 4 is an enlarged diagram showing details of an example of a servo controller used in the servo control apparatus in FIG. 3.

FIGS. 3 and 4 are diagrams generally showing the first embodiment of the servo control apparatus according to the present invention. In FIG. 3, the servo control apparatus of the present invention is provided with two sets of servo control circuits configured with servo controllers 3a, 3b, servo amplifiers 4a, 4b, servo motors 5a, 5b, feedback detectors 6a, 6b and abnormality detectors 7a, 7b which are disposed and arranged in the same way as in the master servo control circuit 2, shown in FIG. 1.

Of the two sets of servo control circuits, one is the master servo control circuit 2a, and the other is the slave servo control circuit 2bThe shafts of servo motor 5a in the master servo control circuit 2a and servo motor 5b in the slave servo control circuit 2b are connected to opposite ends of a shaft 12 to which a load, not illustrated, is connected via a drive transmission mechanism 13; both servo motors 5a and 5b control the load so as to follow a reference control value set by a reference control adjuster 1.

In addition, a torque command selector 21 is provided at a location upstream of the servo amplifier 4b in the slave servo control circuit 2b, and selects and switches the torque command signal according to a signal sent from an abnormality detector 7a in the master servo control circuit 2a. A torque command value calculated by the master servo controller 3a is input into the master servo amplifier 4a, and a torque command value is input to the slave servo amplifier 4b from either the master or slave servo controller 3a or 3b, as selected by the torque command selector 21.

The reference control adjuster 1 produces reference control signals to be followed by the load, for instance, reference position values or reference speed values, continuously and sends them to servo controllers 3a and 3b as commands. Feedback detectors 6a and 6b can detect the angular position, speed, etc. of the shaft 12 using a rotary encoder, resolver, pulse generator, etc. The drive transmission mechanism 13 can be configured with gears, rack and pinion drive, chain, timing belt, etc.

Each servo controller 3a or 3b computes a torque command value to be sent to servo amplifiers 4a, 4b according to the reference control signal from the reference control adjuster 1 and a feedback signal from the respective feedback detectors 6a, 6b.

The method of calculating the torque command value based on the reference control value and the feedback value is, for example, a PID control or two degrees of freedom PID control method when the reference control and feedback values are speeds. If the reference control and feedback values are positions, a reference speed value is calculated by the PID control or two degrees of freedom FID control method, and a torque command value can be calculated which is proportional to the difference between the reference speed value and the speed feedback value obtained by differentiating the position feedback value with respect to time in servo controllers 3a, 3b, for instance.

FIG. 4 is a more detailed view showing an example of the servo controller 3a. The servo controller 3a has a position reference control value and a position feedback value as its inputs; based on the reference control value and the feedback value, a reference speed value is calculated by a PID control method, and a torque command value is computed that is proportional to the difference between the reference speed value and the speed feedback value obtained by differentiating the position feedback value with respect to time in the servo controller 3a, as typically shown in FIG. 4.

The servo controller 3a is provided with a subtractor 22 that calculates the difference in positions between the reference control value entered from the reference control adjuster 1 and position feedback value input from the feedback detector 6a, a PID controller 23 for computing the reference speed value by a PID computation method using the position difference calculated by and input from the subtractor 22, a differentiator 24 that calculates a speed feedback value by differentiating the position feedback value with respect to time, a subtractor 25 for calculating the difference between the reference speed value obtained from the PID controller 23 and the speed feedback value obtained from the differentiator 24, i.e. the speed difference, and a multiplier 26 that computes the torque command value to be sent to the servo amplifier 4a by multiplying the speed difference calculated in the subtractor 25 by a gain setting.

This servo controller 3a is provided with a feedback signal checker 27 that checks the feedback signal to see if there is any abnormality, for example, if the voltage of the feedback signal is excessively low or the result of a parity check is not normal, and decides that an error has occurred and generates an error signal, a first excess value checker 28 that decides an error has occurred if the position difference calculated by the subtractor 22 is excessive and generates an error signal, a second excess value checker 29 that judges an error has occurred if the speed difference computed by the subtractor 25 is abnormally high and generates an error signal, and a watchdog timer 30 that monitors the operation of an arithmetic circuit in the servo controller 3a and decides an error has occurred if the timer times out and generates an error signal.

The error signals produced by the feedback signal checker 27, excess value checkers 28, 29 and watchdog timer 30 are all sent to the error detector 7a. The servo controller 3b is configured in the same way as the above-mentioned servo controller 3a.

Each servo amplifier 4a or 4b controls the supply of electric power to the respective servo motors 5a or 5b so they are capable of producing the torque required by the torque command signal, and thus controlled power is supplied to corresponding servo motor 5a or 5b. Typically, power is controlled by the pulse width modulation (PWM) control method, wherein an IGBT or power transistor is turned ON and OFF according to a vector control principle, for instance.

Each servo motor 5a or 5b generates the torque required by the torque command signal using power supplied from the respective servo amplifiers 4a or 4b, rotates a shaft 12, thereby driving a load through a drive transmission mechanism 13 to follow the reference control value.

Error detectors 7a and 7d in the master and slave servo control circuits 2a and 2b detect errors in the corresponding servo controllers 3a or 3b, servo amplifiers 4a or 4b, servo motors 5a or 5b, and feedback detectors 6a and 6b. Any of the following detection methods are used in practice.

First, to detect an abnormality in servo controllers 3a and 3b, (1) an error in the arithmetic circuit is detected by time-out of the watchdog timer 30, (2) a control error is detected by observing an excessive difference between the reference control value and the feedback value, and (3) an error in the feedback values is detected by an excessively low voltage signal from the feedback detector 6a or 6b, or a parity error.

Next, methods for detecting an error in the servo amplifier 4a or 4b include, for instance, (1) a method of detecting an error in the arithmetic circuit by time-out of a watchdog timer not illustrated, (2) another method of detecting an error in a control process or circuit by detecting an excessive electric current, flowing in any power control element (not illustrated), and another method for detecting an error in a control process or circuit by measuring the temperature of any power control element (not illustrated) and detecting an over-temperature.

In addition, an error in the servo motors 5a or 5b can be detected by, for instance, measuring the temperature of the motor unit (not illustrated) using a temperature sensor embedded in the unit, and detecting an excessive temperature riser thus an error in a control process or circuit can be detected.

Moreover, to detect an error in the feedback detector 6a or 6b, if the aforementioned feedback detectors 6a and 6b are of a type using an optical encoder, the encoder measures the amount of light, and if the amount is insufficient, it is decided that an error has occurred, for example.

When there is no abnormality, the torque command value selector 21 is switched so that the torque command value is input into the slave servo amplifier 4b, from the master servo controller 3a. Only when an error occurs in the master servo control circuit 2a, the torque command value is input into the servo amplifier 4b from the slave servo controller 3b. Therefore, when there is no abnormality in any of the master and slave servo control circuits 2a and 2b, the master servo controller 3a inputs a torque command value into the master servo amplifier 4a and into the slave servo amplifier 4b via the torque command value selector 21. Thereby, both the master and slave servo motors 5a and 5b operate in the master-slave torque control mode to make the load follow the reference control value. At this time, the torque command value computed in the slave servo controller 3b is not used.

If the error detector 7a detects an abnormality in the servo controller 3a, servo amplifier 4a, servo motor 5a or feedback detector 6a in the master servo control circuit 2a, the master servo amplifier 4a is stopped from supplying power to the servo motor 5a by a signal sent from the error detector 7a, and the servo motor 5a is allowed to run freely. In addition, the torque command value selector 21 is switched by a signal transmitted from the above-mentioned error detector 7a, so that torque command signals are input from the slave servo controller 3b into the slave servo amplifier 4b, therefore a control loop composed of the servo controller 3b, servo amplifier 4b, servo motor 5b and feedback detector 6b in the slave servo control circuit 2b continues to control the load so as to follow the reference control value. At this time, because the slave servo controller 3b has been computing torque command values before the torque command value selector 21 was switched, parameters depending on past control information, for example, outputs from an integrating unit, are continuously preserved, therefore, torque command values to the servo amplifier 4b are smoothly transferred when the torque command value selector 21 is switched.

On the other hand, if an abnormality is detected by the error detector 7b in the servo controller 3b, servo amplifier 4b, servo motor 5b or feedback detector 6b in the slave servo control circuit 2b, the slave servo amplifier 4b stops supplying power to the servo motor 5b, and the servo motor 5b is allowed to run freely. Thus, the load is continuously controlled to follow the reference control value by the other control loop comprised of the servo controller 3a, servo amplifier 4a, servo motor 5a and feedback detector 6a in the master servo control circuit 2a.

Consequently, when the reference control adjuster 1 is adjusted to generate a reference control value to stop the load if an error is detected by the error detector 7a or 7b in either the master or slave servo control circuit 2a or 2b described above, the normal servo control circuit 2a or 2b of either the master or slave control circuits can continue normal control operations, therefore, the load can be stopped by following the reference control value.

To cut off the power supplied to the above-mentioned servo motor 5a or 5b, the signal controlling the gate of an IGBT or power transistor is turned OFF, or a contactor is opened, and so on.

According to the servo control apparatus of the present invention, as describe above, the load can be controlled continuously and can follow the reference control value even if an abnormality occurs in any portion of the servo controllers 3a, 3b, servo amplifiers 4a, 4b, servo motors 5a, 5b and feedback detectors 6a, 6b, that is, in any component element. Once an abnormality arises, the load can be stopped by a controlled braking force produced electrically by servo motors 5a, 5b following the reference control value, thus the load can be prevented from running away. Therefore, when the aforementioned servo control apparatus is applied as a servo control apparatus for driving the transfer mechanism of a press machine, the transfer mechanism can be operated in synchronism with the dies until the dies stop even if any abnormality occurs in the servo control apparatus, so a collision between the dies and the transfer mechanism can be avoided. Also when the range of movement of a load is small as in the case of the transfer mechanism of a press machine, the transfer mechanism can be prevented from overrunning when an abnormality occurs, thus the press machine can be protected from damage and the availability of the press machine can be increased.

The electrical circuit, one of the component devices of the present apparatus can be constituted without requiring parts subject to yearly deterioration, such as relay contacts, consequently, the circuit can be operated stably for a long time.

Figure 5:
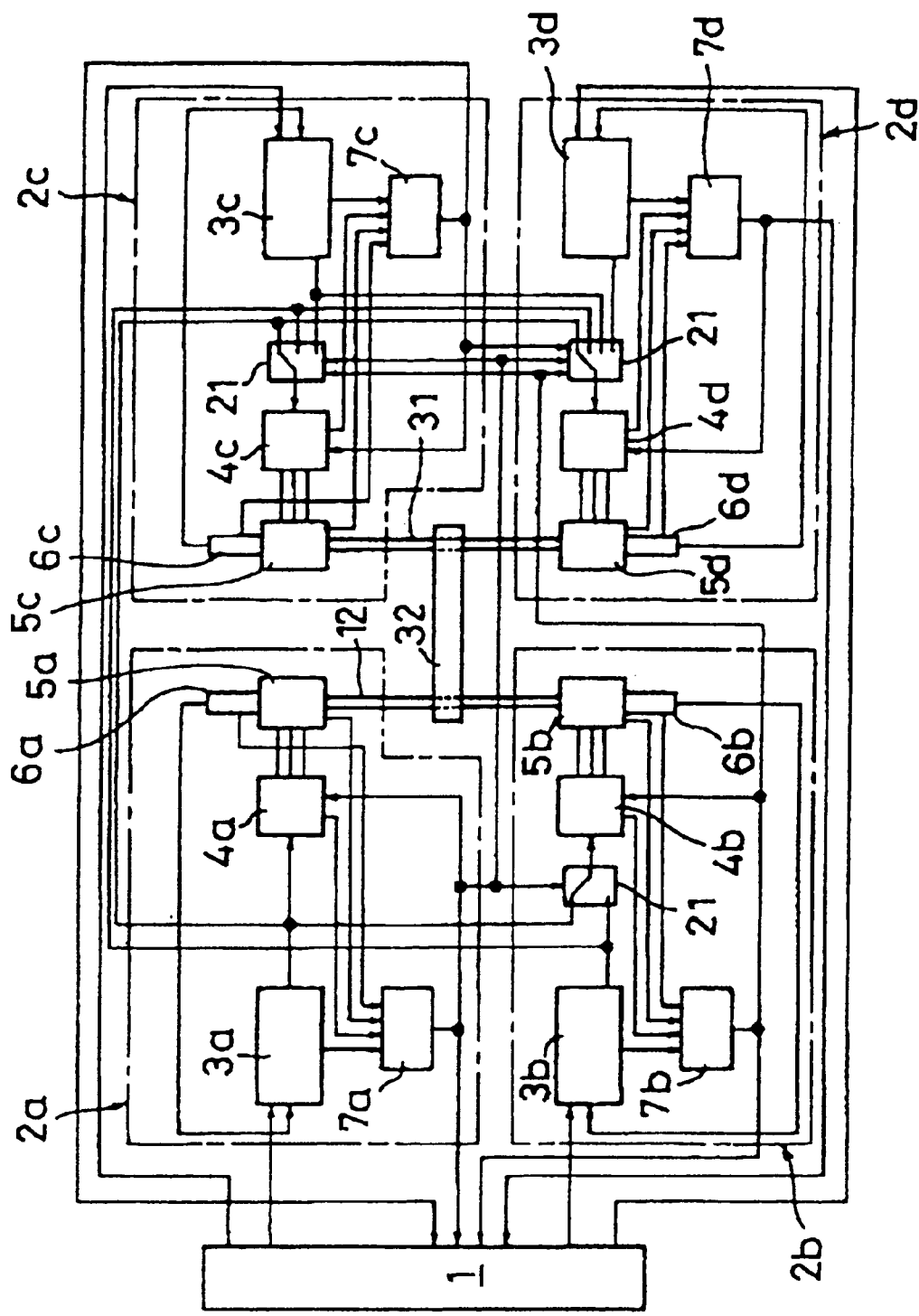
FIG. 5 is a schematic diagram of the second embodiment of the servo control apparatus according to the present invention.

FIG. 5 is a schematic diagram showing the second embodiment of the present invention. This servo control apparatus is composed of a master servo control circuit 2a, configured in the same way as those shown in FIGS. 3 and 4, and three sets of servo control circuits 2b, 2c, 2d with the same configuration as the slave servo control circuit shown in FIGS. 3 and 4; servo motors 5a, 5b, 5c, 5d in these four sets of servo control circuits 2a, 2b, 2c, 2d are interlocked mechanically to drive a load, not illustrated, so as to follow a reference control value set by a reference control adjuster 1.

Each torque command value selector 21 provided in each of the aforementioned slave servo control circuit 2b, 2c, or 2d is configured as follows.

The torque command value selector 21 in the servo control circuit 2b selects the torque command value from the servo controller 3a when the error detector 7a does not detect an abnormality in the servo control circuit 2a, or another torque command value from the servo controller 3b when the error detector 7a detects an abnormality in the servo control circuit 2a, and outputs either command value to the servo amplifier 4b.

The torque command value selector 21 provided in the servo control circuit 2c selects a torque command value from the servo controller 3a when the error detector 7a does not detect an abnormality in the servo control circuit 2a, and another torque command value from the servo controller 3b when the error detector 7a detects an abnormality in the servo control circuit 2a and the error detector 7b does not detect any abnormality in the servo control circuit 2b, and selects another torque command value from the servo controller 3c when the error detector 7a detects an abnormality in the servo control circuit 2a and the error detector 7b detects an error in the servo control circuit 2b, and sends one of these torque command values to the servo amplifier 4c.

The torque command value selector 21 provided in the servo control circuit 2d selects a torque command value from the servo controller 3a when the error detector 7a does not detect any error in the servo control circuit 2a, or another torque command value from the servo controller 3b when the error detector 7a detects an error in the servo control circuit 2a and the error detector 7b does not detect an abnormality in the servo control circuit 2b, or another torque command value from the servo controller 3c when the error detector 7a detects an error in the servo control circuit 2a, the error detector 7b detects an abnormality in the servo control circuit 2b and the error detector 7c does not detect an error in the servo control circuit 2c, or another torque command value from the servo controller 3d when the error detector 7a detects an error in the servo control circuit 2a, the error detector 7b detects an abnormality in the servo control circuit 2b and the error detector 7c detects an error in the servo control circuit 2c, and outputs one of these torque command values to the servo amplifier 4d.

Item number 31 refers to a shaft both ends of which are connected to the shafts of the slave servo motors 5c and 5d, and item number 32 is a drive transmission device that mechanically links shafts 12 and 31 and drives a load that is not illustrated. This drive transmission mechanism 32 is composed of gears, rack and pinions, chains, timing belts, etc. although not illustrated.

The same components in FIGS. 3 and 5 are identified with the same item numbers, and each component element in the slave servo control circuits 2c and 2d in FIG. 5 is identified with a suffix c or d to discriminate it from those in FIG. 3.

In this embodiment, when the error detector 7a detects an error in the servo control circuit 2a and the error detector 7b detects an abnormality in the servo control circuit 2b, for example, a torque command value from the servo controller 3c is output to servo amplifiers 4c and 4d. More explicitly, of the two normal sets of servo control circuits 2c, 2d, the servo control circuit 2c becomes the master, and the servo control circuit 2d functions as the slave, while the load continues to be controlled in the master-slave torque mode, wherein the load is controlled so as to follow the reference control signal from the reference control adjuster 1.

Or, when the error detector 7a detects an abnormality in the servo control circuit 2a and the error detector 7c senses an error in the servo control circuit 2c, for example, the torque command value from the servo controller 3b in the servo control circuit 2b is output to servo amplifiers 4b and 4d. In other words, of the two normal sets of servo control circuits 2b, 2d, the servo control circuit 2b works as the master, and the servo control circuit 2d as the slave, so the master-slave torque control configuration continues to control the load to follow the reference control value from the reference control adjuster 1.

Otherwise, when the error detector 7a detects an abnormality in the servo control circuit 2a and the error detector 7b detects an error in the servo control circuit 2b and the error detector 7c detects an error in the servo control circuit 2c, for instance, the torque command signal from the servo controller 3d in the servo control circuit 2d is output to the servo amplifier 4d. That is, the one normal servo control circuit 2d continues to control the load so as to follow the reference control signal from the reference control adjuster 1.

As such, even if two or three of the servo control circuits 2a, 2b, 2c and 2d, fail at the same timer the remaining normal set or sets of servo control circuits 2a, 2b, 2c or 2d can continue to control the load in the master-slave torque control configuration, therefore the reliability of the system can further be increased.

However, the present invention is not limited only to the above-mentioned embodiments; although FIG. 3 shows a system wherein two servo motors 5a and 5b are interlocked with each other by driving opposite ends of one shaft 12, methods of interlocking through gears or a timing belt can also be used. Also when the error detector 7a detects an abnormality in the master servo control circuit 2a, the control gain of the slave servo controller 3b can be adjusted, or when an error in the slave servo control circuit 2b is sensed by the error detector 7b, the control gain of the master servo controller 3a may also be changed. In such a case as described above, compensation can be made for variations in control characteristics that may take place when an abnormality occurs, caused by the fact that only one of the servo motors 5a or 5b generates torque. In addition, when the error detector 7a or 7b detects an abnormality in the master or slave servo control circuit 2a or 2b, the reference control adjuster 1 can produce a reference control value with a smaller maximum acceleration than that for normal operation. In this case, either one of the servo motors 5a and 5b can provide sufficient torque to follow the reference control value when an error occurs, therefore even if the available torque is insufficient to make the load follow the reference control value for normal operation, the servo control apparatus according to the present invention can be applied. Also, the type of reference control value to be produced by the reference control adjuster 1 and the methods by which the servo controllers 3a, 3b compute torque command values can be changed when the error detector 7a or 7b detects an error in the master or slave servo control circuit 2a or 2b, respectively. For instance, during normal operation, the reference control adjuster 1 provides a reference position and servo controllers 3a, 3b performing a position feedback control operation, and when the error detector 7a or 7b detects an error, the reference control adjuster 1 can be changed to provide a reference speed value while the servo controllers 3a, 3b are changed to speed feedback control. Furthermore, it is also possible to configure part or all of error detectors 7a, 7b to be contained within servo controllers 3a, 3b or servo amplifiers 4a, 4b or distributed between the controllers and the amplifiers. Or, another possible configuration is that error detectors 7a, 7b for servo controllers 3a, 3b, servo amplifiers 4a, 4b, servo motors 5a, 5b and feedback detectors 6a, 6b are housed as one set inside servo controllers 3b, 3a or another set in servo amplifiers 4b, 4a. Other applicable configurations include one in which the servo controller 3a and the servo amplifier 4a are integrated into one body and the servo controller 3b and the servo amplifier 4b are combined together, or one in which a reference control adjuster is built into each of servo controllers 3a, 3b to produce a reference control value, or one in which a speed command instead of a torque command is sent from the servo controller to the servo amplifier to input a speed command value into servo amplifiers 4a, 4b.

Although FIG. 3 shows a case in which two servo motors 5a and 5b operate in a torque master-slave system when no error occurs, if the mechanical connection between servo motors 5a and 5b is flexible, the torque command value selector 21 can be omitted, that is, the system configuration can be modified so that the servo amplifier 4a always receives torque command values from the servo controller 3a, while the servo amplifier 4b receives torque command values at all times from the servo controller 3b. Other modifications and adjustments can of course be effected as long as the claims of the present invention are not exceeded.

According to the servo control apparatus of the present invention as described above, a servo control circuit is composed of a servo controller that computes torque command signal so that a load can follow a reference control value set by the reference control adjuster, a servo amplifier for controlling the electric power supplied to the servo motor according to a command signal sent from the above-mentioned servo controller, a servo motor that drives the load using power supplied from the servo amplifier, and a feedback detector for detecting the operating status of the servo motor and feeding back the status to the servo controller, thereby a single servo control circuit can control the load; a plurality of servo control circuits are provided, and the servo motor in each of the aforementioned servo control circuits is mechanically interlocked with other servo motors in other servo control circuits so that one load can be driven through a drive transmission mechanism. In addition, the above-mentioned configuration can continue to control the load even when an abnormality occurs in any of the above-mentioned plurality of servo control circuits, using a normal servo control circuit or normal servo control circuits.

Therefore, even when an abnormality occurs in any portion of the servo controller, servo amplifier, servo motor and feedback detector, i.e. component elements of the servo control apparatus, the load can be continuously controlled and follow the reference control value. If an abnormality arises, the load can be stopped by a controlled braking force produced electrically in the servo motor following the reference control value, consequently the load can be prevented from running away.

Therefore, when the aforementioned servo control apparatus is applied to drive the transfer mechanism of a press machine, even if any abnormality occurs in the servo control apparatus, the transfer mechanism can be operated in synchronism with the dies until the dies stop, so the transfer mechanism can be prevented from colliding with the dies. In addition, when the range of movement of the load is restricted, such as in the case with the transfer mechanism of a press machine, the transfer machine can be prevented from overrunning if an error occurs, therefore the press machine can be protected from damage, resulting in an increase in the operating availability of the press machine. Moreover, the electrical circuit constituting this apparatus does not include any components that can deteriorate with time, such as relay contacts, consequently, the apparatus has the preferred advantage that it can operate stably for a long time.

Furthermore, one of a plurality of servo control circuits is made the master servo control circuit, and the others are defined as slave servo control circuits, and at a location upstream of the servo amplifier in the above-mentioned slave servo control circuits, a slave servo amplifier is arranged to receive command inputs normally from the master servo controller, and a command value selector is provided and is capable of switching to the slave servo controller to input command values if the master servo control circuit fails unexpectedly, thereby the load can be controlled in the master-slave mode to follow the reference control value using both the master and slave servo motors as long as no abnormality arises in either the master or slave servo control circuits. This performance is a preferable advantage.

Although the present invention has been described referring to several preferred embodiments, the scope of rights included in the present invention should be understood not to be limited only to these embodiments. Conversely, the scope of rights of the present invention includes all modifications, improvements and equivalent entities covered by the attached claims.

What is claimed is:

1. A servo control apparatus comprising a plurality of electrically connected servo control circuits that are electrically connected to a reference control adjuster, each servo control circuit operationally connected to mechanically and independently apply torque to a shaft, wherein each servo control circuit comprises:

a servo controller that performs a control computation for generating a torque command signal in response to a reference control signal received from the reference control adjuster, wherein the reference control signal directs the amount of torque applied to the shaft to drive a load;

a servo amplifier electrically connected to the servo controller wherein the servo amplifier controls electric power in response to the command signal sent from the servo controller;

a servo motor electrically connected to and powered by the servo amplifier, wherein the servo motor is supplied by electric power controlled by the servo amplifier, and wherein the servo motor applies torque to the shaft to drive the load; and a feedback detector mechanically connected to the servo motor and electrically connected to the servo controller, wherein the feedback detector detects the operating status of the servo motor and feeds the status back to the servo controller so that the servo motor is operated to drive the load, wherein each servo motor of the plurality of servo control circuits are mechanically interlocked with each other servo motor so that the load is driven by the combined torque generated by the plurality of servo control circuit& transmitted through a drive transmission mechanism, and when any of the plurality of servo control circuits operates abnormally each abnormally operating servo control circuit allows the respective servo motor to run freely thereby generating torque and each remaining normally operating servo control circuit operates to continuously drive the load to follow a reference control value determined by the reference control adjuster.

2. A servo control apparatus according to claim 1, wherein one of the plurality of servo control circuits is a master servo control circuit and each other servo control circuit of the plurality of servo control circuits is a slave servo control circuit, and each slave servo control circuit further comprises a torque command value selector electrically connected to the respective amplifier of the slave servo control circuit and to the servo controller of the master servo control circuit, wherein the amplifier of each slave control circuit receives a respective input command signal from the servo controller of the master servo control circuit via the respective torque command value selector of the slave servo control circuit when the master control circuit operates normally so that the servo motor of the master servo control circuit and the servo motor of each slave servo control circuit operate in a master-slave torque control mode to make the load follow the reference control value determined by the reference control adjuster.

3. A servo control apparatus according to claim 2, wherein the master servo control circuit further comprises an error detector electrically connected to the servo controller, the servo amplifier, the servo motor and the feedback detector of the master servo control circuit and to the torque command value selector of each slave servo control circuit so that when the error detector detects an error in the operation of the master servo control circuit the error detector sends a signal to each torque command value selector so that each torque command value selector operates to input a torque command signal into the amplifier of the respective slave servo control circuit, thereby activating a control loop in each slave servo control circuit for controlling the load so as to follow the reference control value.

4. A servo control apparatus according to claim 2, wherein the plurality of servo control circuits includes at least one slave servo control circuit.

5. A servo control apparatus according to claim 2, wherein the plurality of servo control circuits includes three slave servo control circuits.

6. A servo control apparatus according to claim 3, wherein the servo motor of each slave servo control circuit operates to apply a controlled braking force to prevent the load from running away when the master servo control circuit operates abnormally.

* * * * *